United States Patent Office 3,705,127
Patented Dec. 5, 1972

3,705,127
POLYMERIC FLAME RETARDANT
COMPOSITIONS
Henryk A. Cyba, Evanston, Ill., assignor to Universal Oil
Products Company, Des Plaines, Ill.
No Drawing. Continuation-in-part of application Ser. No. 757,764, Sept. 5, 1968, now Patent No. 3,574,230, dated Apr. 6, 1971. This application Dec. 21, 1970, Ser. No. 100,440
Int. Cl. C08f 45/60; C08g 51/60
U.S. Cl. 260—881
7 Claims

ABSTRACT OF THE DISCLOSURE

Novel compositions of matter comprising a polymeric compound and a haloaryl imide of a polyhalo-substituted polyhydropolycyclicdicarboxylic acid as exemplified by polypropylene and $\alpha,\alpha$-bis(5,6,7,8,9,9-hexachloro-1,2,3,4,4a,5,8,8a-octahydro-5,8-methano-2,3 - naphthalenedicarboximido)-2,3,5,6-tetrachloro-p-xylene possesses certain desirable physical properties such as being flameproof or fire resistant.

CROSS REFERENCE TO RELATED APPLICATION

This application is a continupation-in-part of my copending application Ser. No. 757,764 filed Sept. 5, 1968, and issued Apr. 6, 1971 as U.S. Pat. No. 3,574,230.

This invention relates to novel compositions of matter comprising a polymeric compound and a haloaryl imide of a polyhalo-substituted polyhydropolycyclicdicarboxylic acid, the desirable composition of matter possessing certain desirable physical characteristics of being resistant to the actions of a flame.

It has now been discovered that certain novel compositions of matter comprising, as hereinbefore set forth, a mixture of a polymeric compound and a haloaryl imide of a polyhalo-substituted polyhydropolycyclicdicarboxylic acid will possess the desirable physical characteristics of being resistant to flame or being able to retard the advance of a flame throughout the finished article. The haloaryl imides of polyhalo-substituted polyhydropolycyclicdicarboxylic acids are useful as additives to plastics, polymers, copolymers, terpolymers, resins, polycondensates, elastomers, rubbers, textiles and fibers, wood and paper, both naturally occurring and synthetic in nature, coatings, paints, varnishes, leather, foams, cellulose acetate butyrate, ethyl cellulose, cellulose propionate, polyolefins such as polyethylene and polyethylene copolymers, synthetic polyethylene paper, polypropylene and polypropylene copolymers, polystyrenes, polystyrene copolymers polyvinyl acetate or alcohol and copolymers, polyvinyl chloride and copolymers, polyvinylidene chloride and copolymers, polyesters, polyurethane, polyphenyl ethers, styrenated polyphenyl ethers, polycarbonates, polyamides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadiene-styrene formulations (commonly known as ABS), polybutylene and acrylic ester-modified-styrene-acrylonitrile (ASA), etc., whereby the desirable physical characteristics of flameproofing or fire retardancy will be imparted to the aforementioned materials. By utilizing the composition of matter of the present invention, a catalytic and/or synergistic action in which the fire retardancy or flameproofing will be greatly enhanced will occur. This particular physical characteristic will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., under hood automotive use, heater ducts, cable and wire coatings, TV-cabinets, appliance housing, car or airplane interior components, automotive vents, etc., boat interiors or exteriors, cushions for various vehicle seats such as airplane seats, automobile seats, bus seats, etc. In addition, the compound when utilized as a constitutent of paint, lacquer, varnishes, or protective coatings, films, etc., will also impart a flame resistancy to these compounds and, therefore, render them commercially attractive as articles of commerce. Also, besides imparting the desirable physical characteristics of flame retardancy to the various articles of manufacture, the additives will render certain polymeric compositions of matter more stable to color changes and, therefore, will be important components of these compounds whenever it is desirable that discoloration of the finished product is to be avoided or will tend to render such articles unusable.

It is therefore an object of this invention to provide novel compositions of matter which possess desirable physical properties.

Another object of this invention is to provide novel compositions of matter which possess the desirable physical characteristics of flameproofing and fire retardancy when utilized in various shapes and forms.

In one aspect an embodiment of this invention resides in a composition of matter comprising a polymeric compound and a haloaryl imide of a polyhalo-substituted polyhydropolycyclicdicarboxylic acid.

A specific embodiment of this invention resides in a composition of matter comprising ABS and 4,4'-bis(1,4,5,6,7,7-hexachlorobicyclo - [2.2.1] - 5-heptene-2,3-dicarboximidomethyl)-2,2',3,3',5,5',6,6' - octachlorodiphenylamine.

Other objects and embodiments will be found in the following further detailed description of the present invention.

As hereinbefore set forth, the present invention is concerned with novel flame retardant compositions of matter comprising a mixture of a polymeric compound and a haloaryl imide of polyhalo-substituted polyhydropolycyclicidicarboxylic acid. In one embodiment the latter compound is prepared by condensing a polyhalopolyhydropolycyclicdicarboxylic acid or anhydride thereof with a halo-substiuted xylene-$\alpha,\alpha'$-diamine or a halo-substituted p-ditolyl ether-, thioether-, amine-, or alkane-$\alpha,\alpha'$-diamine, details of the condensation being set forth in a more specific manner in a latter portion of the specification. Any suitable polyhalo-substituted polyhydropolycyclicdicarboxylic acid or anhydride thereof may be used in the preparation of the desired composition of matter, said polyhalo-substiuted polyhydropolycyclicdicarboxylic acid or anhydride thereof being illustrated by the following general formulas:

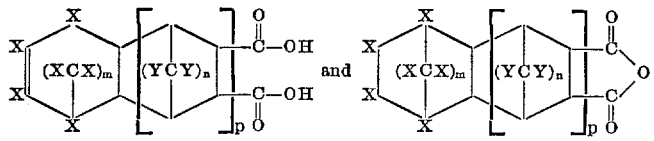

in which X is selected from the group consisting of halogen and particularly chlorine and/or bromine, and hydrogen radicals, at least two of the X's being halogen, Y is also selected from the group consisting of halogen and hydrogen radicals, m is an integer of from one to two, n ranges from zero to two and p ranges from zero to one. Representative examples of the polyhalopolyhydropolycyclicdicarboxylic acids or anhydrides thereof which may be utilized include 1,4,5,6,7,7-hexachlorobicyclo-[2.2.1]-5-heptene-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9-hexachloro-1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxyl acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro-1,2,3,4,4a,5, 8,8a - octahydro - 1,4,5,8-dimethano-2,3-naphthalenedicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes include 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2-dichlorocyclopentadiene, 1,2,3-trichlorocyclopentadiene, 1,2,3,4-tetrachlorocyclopentadiene, 1,2,3,4,5 - pentachlorocyclopentadiene and similar compounds in which all or part of the chlorine is replaced by other halogen atoms and particularly bromine.

The aforementioned polyhalopolyhydropolycyclicdicarboxylic acids or anhydrides thereof are condensed with a compound possessing the generic formula:

or

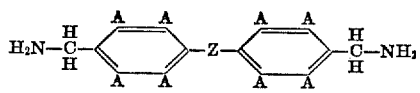

which for purposes of this invention, are designated as halo-substituted xylene-α,α'-diamines or halo-substituted p-ditolyl ether-, thioether-, amine-, or alkane-α,α'-diamines. In the aforementioned formulae, A is selected from the group consisting of halogen and hydrogen radicals, at least one A being halogen, preferably chlorine or bromine, an Z is selected from the group consisting of oxygen, sulfur, amino, and alkyl radicals. Specific examples of these compounds will include 2-chloro-p-xylene-α,α'-diamine,
2,3-dichloro-p-xylene-α,α'-diamine,
2,3,5-trichloro-p-xylene-α,α'-diamine,
2,3,5,6-tetrachloro-p-xylene-α,α'-diamine;
2-bromo-p-xylene-α,α'-diamine,
2,3-dibromo-p-xylene-α,α'-diamine,
2,3,5-tribromo-p-xylene-α,α'-diamine,
2,3,5,6-tetrabromo-p-xylene-α,α'-diamine;
2,2'-dichloro-p-tolyl ether-α,α'-diamine, 2,2',3,3'-tetrachloro-p-tolyl ether-α,α'-diamine,
2,2',3,3',5,5',6,6'-octachloro-p-tolyl ether-α,α'-diamine;
2,2'-dichloro-p-tolyl thioether-α,α'-diamine,
2,2',3,3'-tetrachloro-p-tolyl thioether-α,α'-diamine,
2,2',3,3',5,5',6,6'-octachloro-p-tolyl thioether-α,α'-diamine;
2,2'-dichloro-p-tolylamino-α,α'-diamine,
2,2',3,3'-tetrachloro-p-tolylamino-α,α'-diamine,
2,2',3,3',5,5',6,6'-octachloro-p-tolylamino-α,α'-diamine;
2,2'-dichloro-p-tolylmethane-α,α'-diamine
2,2',3,3'-tetrachloro-p-tolylmethane-α,α'-diamine,
2,2',3,3',5,5',6,6'-octachloro-p-tolylmethane-α,α'-diamine;
2,2',3,3'-tetrachloro-diphenyl-2,2'-propane-α,α'-diamine;
2,2'-dibromo-p-tolyl ether-α,α'-diamine,
2,2',3,3'-tetrabromo-p-tolyl ether-α,α'-diamine,
2,2',3,3',5,5',6,6'-octabromo-p-tolyl ether-α,α'-diamine;
2,2'-dibromo-p-tolyl thioether-α,α'-diamine,
2,2',3,3'-tetrabromo-p-tolyl thioether-α,α'-diamine;
2,2',3,3',5,5',6,6'-octabromo-p-tolyl thioether-α,α'-diamine;
2,2'-dibromo-p-tolylamino-α,α'-diamine
2,2',3,3'-tetrabromo-p-tolylamino-α,α'-diamine
2,2',3,3',5,5',6,6'-octabromo-p-tolylamino-α,α'-diamine;
2,2'-dibromo-p-tolylmethane-α,α'-diamine,
2,2',3,3'-tetrabromo-p-tolylmethane-α,α'-diamine,
2,2',3,3',5,5',6,6'-octabromo-p-tolylmethane-α,α'-diamine;
2,2',3,3'-tetrabromo-diphenyl-2,2'-propane-α,α'-diamine; etc.

In addition, it is also contemplated within the scope of this invention that m-xylenes such as 2-chloro-m-xylene-α,α'-diamine,
2,4-dichloro-m-xylene-α,α'-diamine,
2,4,5-trichloro-m-xylene-α,α'-diamine,
2,2'-dichloro-m-ditolyl ether-α,α'-diamine,
2,2',4,4'-m-ditolyl ether-α,α'-diamine,
2,2'-dichloro-m-ditolyl thioether-α,α'-diamine,
2,2',4,4'-m-ditolyl thioether-α,α'-diamine,
2,2'-dichloro-m-ditolylamine-α,α'-diamine,
2,2',4,4'-m-ditolylamine-α,α'-diamine,
2,2'-dichloro-m-ditolylmethane-α,α'-diamine, as well as the bromo-substituted analogs thereof may also be condensed with the aforementioned acids or anhydrides to prepare the desired compounds. It is to be understood that the aforementioned compounds are only representative of the class of compounds which may be used and that the present invention is not necessarily limited thereto.

As hereinbefore set forth, the haloaryl imides of a polyhalo-substituted polyhydropolycyclicdicarboxylic acid are prepared by condensing a polyhalopolyhydropolycyclicdicarboxylic acid or anhydride thereof of the type hereinbefore set forth in greater detail with a halo-substituted xylene-α,α'-diamine or a halo-substituted ditolyl ether-, thioether-, amine-, or alkane-α,α'-diamine at condensation conditions which include a temperature in the range of from ambient (about 25° C.) up to about 250° C. or more and at a pressure which may range from atmospheric up to about 50 atmospheres or more. In the event that elevated temperatures in the upper limit of the aforementioned range are employed, it is contemplated that the reaction will be effected at superatmospheric pressures. These superatmospheric pressures are generated by the introduction of a substantially inert gas such as nitrogen into the reaction zone, said pressure which is used being that which is sufficient to maintain a major portion of the reactants in the liquid phase. Generally speaking, in the preferred embodiment of the process, the reaction or condensation is effected in the presence of a substantially inert organic solvent. Therefore, when utilizing such a solvent, the temperature which is employed will usually be that of the reflux temperature of the solvent. Specific examples of the type of solvents which may be employed will include aromatic hydrocarbons such as benzene, toluene, the xylenes, ethylbenzene, etc.; aliphatic and cycloaliphatic paraffins such as n-pentane, n-hexane, n-heptane, cyclopentane, methylcyclopentane, etc.; alcohols such as methyl alcohol, ethyl alcohol, n-propyl alcohol, isopropyl alcohol, n-butyl alcohol, etc.; ethers such as dimethyl ether, diethyl ether, dipropyl ether, etc.; the dimethyl ether of diethylene glycol, the diethyl ether of diethylene glycol, dioxane, various esters, chlorinated hydrocarbons etc. The residence time during which the condensation is effected will be of a duration which is sufficient to effect as substantially complete reaction and may vary in time from about 0.5 up to about 10 hours or more, the reaction being substantially complete when the theoretical amount of water which has been formed during the condensation has been recovered. In addition, the mol ratio of polyhalopolyhydropolycyclicdicarboxylic acid or anhydride thereof to the diamine compound will vary over a wide range depending upon the particular compound which is to be the desired product. Therefore, the mol ratio may range from 1:1 up to about 5:1 mols of polyhalopolyhydropolycyclicdicarboxylic acid or anhydride thereof per mol of diamine compound. For example, when the desired product will comprise a monoimide, the reactants will be present in a 1:1 molar ratio. However, if a bisimide is to be the final product, the acid or anhydride will be present in a molar excess ranging from 2:1 up to about 5:1 mols of acid or anhydride per mol of diamine compound.

The process of the present invention may be effected in any suitable manner and may comprise either a batch or continuous type operation. For example, when a batch type operation is used a quantity of the particular acid or anhyride and diamine compound is placed in an appropriate apparatus along with a particular solvent if one is desired. The apparatus, which may comprise a condensation flask, is provided with heating and stirring means as well as a water trap whereby the water of reaction which is formed may be withdrawn. The flask is then heated to the desired operating temperature, which if a solvent is used, is the reflux temperature thereof, and allowed to proceed for a predetermined resident time. This time is calculated as when the theoretical amount of water has been removed. Following this the flask and contents thereof are allowed to cool to room temperature and the reaction product is recovered. The product is then separated from any solvent by conventional means as evaporation, suction, filtration, etc., and recovered. In the event that superatmospheric temperatures and pressures are to be used, the reactor which is employed for the batch type operation may comprise a rotating or stirred autoclave whereby the desired pressure may be attained by charging nitrogen to the reactor prior to heating to the desired operating temperature.

It is also contemplated within the scope of this invention that a continuous manner of operation may be employed. When such a type of operation is used the starting material comprising the acid or anhydride of the type hereinbefore set forth in greater detail and the diamino compound are continuously charged to the reactor which is maintained in the proper operating conditions of temperature and pressure. In the event that a solvent is to be employed, one or both of the reactants may be dissolved in the solvent prior to entry into said reactor. Alternatively speaking, the solvent may be charged to the reactor in a separate stream if so desired. Upon completion of the desired residence time the reaction effluent is continuously withdrawn. The reaction product is separated from the water of reaction which is formed in the solvent by conventional means. In addition, the reaction product is also separated from any unreacted starting material which may still be present in the reactor, the latter being recycled to form a portion of the feed stock. The desired haloaryl imides of the halo-substituted polyhydropolycyclicdicarboxylic acids are recovered.

While the aforementioned method for preparing the haloaryl imide of a polyhalo-substituted polyhydropolycyclicdicarboxylic acid has illustrated the condensation of a halo-substituted polyhydropolycyclicdicarboxylic acid or anhydride with a compound containing at least one amino substituent, it is also contemplated within the scope of this invention that other processes for preparing the desired products may also utilized. For example, the diamine compound may also be reacted with an unsaturated dibasic acid or anhydride, thereafter adding a diolefinic hydrocarbon to the resultant imide followed by further addition of a halogenated diene. For example, maleic acid or maleic anhydride may be condensed with 2,3,5,6-tetrachloro-p-xylene-α,α'-diamine in a mol ratio of two mols of maleic acid or maleic anhydride per mol of diamine to form a bisimide, thereafter condensing the bisimide with 1,3-butadiene, followed by the further addition of hexachlorocyclopentadiene to form a novel composition of matter comprising α,α'-bis-[5,6,7,8,9,9-hexachloro-1,2,3,4,4a,5,8,8a-octahydro - 5,8 - methano-2,3-naphthalenedicarboximido]-2,3,5,6-tetrachloro-p-xylene.

Some illustrative examples of the haloaryl imides of polyhalo-substituted polyhydropolycyclicdicarboxylic acids which may be prepared will possess the generic formulae:

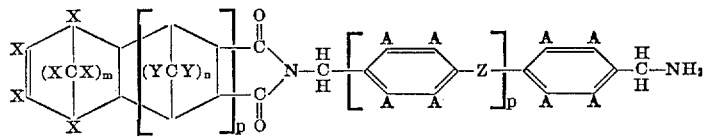

or

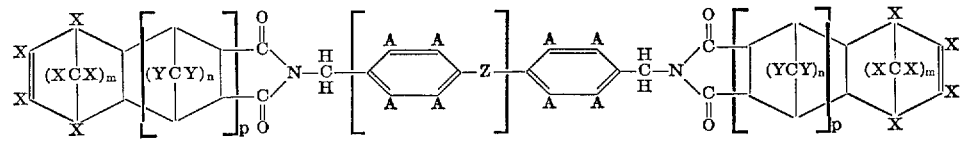

in which A, X, and Y are independently selected from the group consisting of hydrogen or halogen, at least one A and two X's being halogen; Z is selected from the group consisting of oxygen, sulfur, amino and lower alkyl radicals; $m$ is an integer of from 1 to 2; $n$ ranges from 0 to 2; and $p$ ranges from 0 to 1.

Some representative specific haloaryl imides of polyhalo - substituted polyhydropolycyclicdicarboxylic acids will include α-amino-α'-(5,6,7,8,9,9-hexachloro-1,2,3,4,4a,5,8,8a-octahydro-5,8-methano-2,3-naphthalenedicarboximido)-2,3-dichloro-p-xylene, α-amino-α'-(5,6,7,8,9,9-hexachloro-1,2,3,4,4a,5,8,8a-octahydro-1,4,5,8-dimethano-2,3-naphthalenedicarboximido)-2,3-dichloro-p-xylene, α-amino-α'-(1,4,5,6,7,7-hexachlorobicyclo-[2.2.1]-5-heptene-2,3-dicarboximido)-2,3-dichloro-p-xylene, α-amino-α'-(5,6,7,8,9,9-hexachloro-1,2,3,4,4a,5,8,8a-octahydro-5,8-methano-2,3-naphthalenedicarboximido)-2,3,5,6-tetrachloro-p-xylene, α-amino-α'-(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, α-amino-α'-(1,4,5,6,7,7-hexachlorobicyclo-[2.2.1]-5-heptene-2,3-dicarboximido)-2,3,5,6-tetrachloro-p-xylene, α-amino-α'-(5,6,7,8,9,9-hexachloro-1,2,3,4,4a,5,8,8a-octahydro-5,8-methano-2,3-naphthalenedicarboximido)-2,4-dichloro-m-xylene,
α-amino-α'-(5,6,7,8,9,9-hexachloro-1,2,3,4,4a,5,8,8a-octahydro-1,4,5,8-dimethano-2,3-naphthalenedicarboximido)-2,4-dichloro-m-xylene,
α-amino-α'-(1,4,5,6,7,7-hexachlorobicyclo-[2.2.1]-5-heptene-2,3-dicarboximido)-2,4-dichloro-m-xylene,
α-amino-α'-(5,6,7,8,9,9-hexachloro-1,2,3,4,4a,5,8,8a-octahydro-5,8-methano-2,3-naphthalenedicarboximido)-2,4,5,6-tetrachloro-m-xylene,
α-amino-α'-(5,6,7,8,9,9-hexachloro-1,2,3,4,4a,5,8,8a-octahydro-1,4,5,8-dimethano-2,3-naphthalenedicarboximido)-2,4,5,6-tetrachloro-m-xylene,
α-amino-α'-(1,4,5,6,7,7-hexachlorobicyclo-[2.2.1]-5-heptene-2,3-dicarboximido)-2,4,5,6-tetrachloro-m-xylene,
α-amino-α'-(5,6,7,8,9,9-hexachloro-1,2,3,4,4a,5,8,8a-octahydro-5,8-methano-2,3-naphthalenedicarboximido)-2,2',4,4'-tetrachloroditolyl ether,
α-amino-α'-(5,6,7,8,9,9-hexachloro-1,2,3,4,4a,5,8,8a-octahydro-1,4,5,8-dimethano-2,3-naphthalenedicarboximido)-2,2',4,4'-tetrachloroditolyl ether,
α-amino-α'-(1,4,5,6,7,7-hexachlorobicyclo-[2.2.1]-5-heptene-2,3-dicarboximido)-2,2',4,4'-tetrachloroditolyl ether,
α-amino-α'-(5,6,7,8,9,9-hexachloro-1,2,3,4,4a,5,8,8a-octahydro-5,8-methano-2,3-naphthalenedicarboximido)-2,2',4,4'-tetrachloroditolyl thioether,
α-amino-α'-(5,6,7,8,9,9-hexachloro-1,2,3,4,4a,5,8,8a-octahydro-1,4,5,8-dimethano-2,3-naphthalenedicarboximido)-2,2',4,4'-tetrachloroditolyl thioether,
α-amino-α'-(1,4,5,6,7,7-hexachlorobicyclo-[2.2.1]-5-heptene-2,3-dicarboximido)-2,2',4,4'-tetrachloroditolyl thioether,
α-amino-α'-(5,6,7,8,9,9-hexachloro-1,2,3,4,4a,5,8,8a-octahydro-5,8-methano-2,3-naphthalenedicarboximido)-2,2',4,4'-tetrachloroditolylamine,
α-amino-α'-(5,6,7,8,9,9-hexachloro-1,2,3,4,4a,5,8,8a-octahydro-1,4,5,8-dimethano-2,3-naphthalenedicarboximido)-2,2',4,4'-tetrachloroditolylamine,
α-amino-α'-(1,4,5,6,7,7-hexachlorobicyclo-[2.2.1]-5-heptene-2,3-dicarboxamido)-2,2',4,4'-tetrachloroditolylamine,
α,α'-bis(5,6,7,8,9,9-hexachloro-1,2,3,4,4a,5,8,8a-octahydro-5,8-methano-2,3-naphthalenedicarboximido)-2,3-tetrachloro-p-xylene,
α,α'-bis(5,6,7,8,9,9-hexachloro-1,2,3,4,4a,5,8,8a-octahydro-1,4,5,8-dimethano-2,3-naphthalenedicarboximido)-2,3-tetrachloro-p-xylene,
α,α'-bis(1,4,5,6,7,7-hexachlorobicyclo-[2.2.1]-5-heptene-2,3-dicarboximido)-2,3-tetrachloro-p-xylene,
α,α'-bis(5,6,7,8,9,9-hexachloro-1,2,3,4,4a,5,8,8a-octahydro-5,8-methano-2,3-naphthalenedicarboximido)-2,3,5,6-tetrachloro-p-xylene,
α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene,
α,α'-bis(1,4,5,6,7,7-hexachlorobicyclo-[2.2.1]-5-heptene-2,3-dicarboximido)-2,3,5,6-tetrachloro-p-xylene,
4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether,
4,4'-bis(5,6,7,8,9,9-hexachloro-1,2,3,4,4a,5,8,8a-octahydro-1,4,5,8-dimethano-2,3-naphthalenedicarboximidomethyl)-2,2',3,3',5,5',6,6'-octachlorodiphenyl ether,
4,4'-bis(1,4,5,6,7,7-hexachlorobicyclo-[2.2.1]-5-heptene-2,3-dicarboximidomethyl)-2,2',3,3',5,5',6,6'-octachlorodiphenyl ether,
4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenylamine,
4,4'-bis(5,6,7,8,9,9-hexachloro-1,2,3,4,4a,5,8,8a-octahydro-1,4,5,8-dimethano-2,3-naphthalenedicarboximidomethyl)-2,2',3,3',5,5',6,6'-octachlorodiphenylamine,
4,4'-bis(1,4,5,6,7,7-hexachlorobicyclo-[2.2.1]-5-heptene-2,3-dicarboximidomethyl)-2,2',3,3',5,5',6,6'-octachlorodiphenylamine,
4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachloro-2,2-diphenylpropane,
4,4'-bis(5,6,7,8,9,9-hexachloro-1,2,3,4,4a,5,8,8a-octahydro-1,4,5,8-dimethano-2,3-naphthalenedicarboximidomethyl)-2,2',3,3',5,5',6,6'-octachloro-2,2-diphenylpropane,
4,4'-bis(1,4,5,6,7,7-hexachlorobicyclo-[2.2.1]-5-heptene-2,3-dicarboximidomethyl)-2,2',3,3',5,5',6,6'-octachloro-2,2'-diphenylpropane,
4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl thioether,
4,4'-bis(5,6,7,8,9,9-hexachloro-1,2,3,4,4a,5,8,8a-octahydro-1,4,5,8-dimethano-2,3-naphthalenedicarboximidomethyl)-2,2',3,3',5,5',6,6'-octachlorodiphenyl thioether,
4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether;

the bromo-substituted analogs thereof, etc. While the above illustrative examples are all drawn to hexahalo-substituted polycyclic portions of the novel compound, it is to be understood that imides containing less than six halogen atoms in the aforementioned cyclic portion such as the pentachloro-, pentabromo-, tetrachloro-, tetrabromo-, trichloro-, tribromo-, -dichloro-, and dibromo-substituted compounds also fall within the scope of this invention and are correspondingly prepared by using a pentahalo-, tetrahalo-, trihalo-, or dihalo-substituted dienic hydrocarbon as starting materials.

The aforementioned haloaryl imides of a polyhalo-substituted polyhydropolycyclicdicarboxylic acid are composited with polymeric compounds of the type hereinbefore set forth to form the novel flame retardant compositions of matter of the present invention, said polymeric compounds including plastics, resins, rubbers, polymers, copolymers, textiles, naturally occurring products such as leather, wood, paints, coatings, etc. For example, the haloaryl imides of the polyhalo-substituted polyhydropolycyclicdicarboxylic acids may be used as additives with polymeric olefins such as polyethylene, polypropylene, etc., whereby the final product will possess advantageous physical properties such as an increased stability against deterioration, weathering, and aging which has been induced by chemical, physical, biological agents, or radiation. In addition, the polyolefins will have a higher ignition point as well as a high degree of flame retardancy. The imides may be added to polypropylene in a range of from about 2% to about 30% by weight of the polymeric material to be treated. Thereafter it will be found that the oxygen index will have increased while the burning rate will be decreased. Examples of other polymeric products which may be treated with the haloaryl imides of the halo-substituted polyhydropolycyclicdicarboxylic acids will include epoxy resins such as the condensation product of epichlorohydrin and bis-phenol-A. The epoxy resins in an uncured state will usually be thermal plastic and may range from low viscosity liquids to high melting point brittle solids. The resins may be cured by mixing a curing agent such as phthalic anhydride with the resin, admixing the resultant mixture with an imide of the acid of the type hereinbefore set forth and thereafter curing the mixture by treatment at an elevated temperature for a predetermined period of time. The resultant product will have the physical characteristics thereof altered to their desirable values as pertains to color stability and flame retardancy and thus may be utilized for various purposes such as floor surfacings, coatings, etc. Other types of polymeric compounds which may be treated with the novel compositions of matter of the present invention will include polyphenyl ethers (polyphenylene oxides) which have been modified by treatment with styrene, acrylonitrile-butadiene-styrene formulation (ABS), polycarbonates, polyesters, polyurethane foams, etc.

It is also contemplated within the scope of this invention that other conventional flame retardants including, but not limited to, phosphate esters, alkyl diaryl phosphates, cresol diphenyl phosphate, octyl diphenyl phosphates, triaryl phosphates, tributyl phosphate, triphenyl phosphate, phosphonate esters, antimony oxide barium metaborate, zinc borate, boric acid, dibutyl tin maleate, etc., may be used in conjunction with the haloaryl imides of halo-substituted polyhdropolycyclicdicarboxylic acids of the present invention.

Some specific examples of the novel compositions of matter of the present invention will include polyethylene and α,α'-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, polypropylene and α,α'-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, polyphenyl oxide and α,α'-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, epoxy resins and α,α'-bis(5,6,7,8,9,9-hexachloro-1,2,3,4,4a5,8,8a-octahydro-5,8-methano-2,3-naphthalenedicarboximido)-2,3,5,6-tetrachloro-p-xylene, ABS and α,α'-bis(5,6,E,8,9,9-hexachloro-1,2,3,4,4a,5,8,8a-octahydro-5,8-methano-2,3-naphthalenedicarboximido)-2,3,5,6-tetrachloro-p-xylene, polyvinyl chloride and α,α-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, polycarbonate and α,α'-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, polyurethane and α,α'-bis(5,6,7,8,9,9-hexachloro-1,2,3,4,4a,5,8,8a-octahydro-5,8-methanol-2,3-naphthalenedicarboximido)-2,3,5,6-tetrachloro-p-xylene, polyesters and α,α-bis(5,6,7,8,9,9-hexachloro-1,2,3,4,4a,5,8,8a-octahydro-5,8-methano-2,3-naphthalenedicarboximido)-2,3,5,6-tetrachloro-p-xylene, polyethylene and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polypropylene and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polyphenyl oxide and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, epoxy resins and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, ABS and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polyvinyl chloride and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polycarbonate and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polyurethane and α,α'-bis(5,6,7,8,9,9-hexachloro-1,2,3,4,4a,5,8,8a-octahydro-1,4,5,8-dimethano-2,3-naphthalenedicarboximido)-2,3,5,6-tetrachloro-p-xylene, polyesters and α,α'-bis(5,6,7,8,9,9-hexachloro-1,2,3,4,4a,5,8a-octahydro-1,4,5,8-dimethano-2,3-naphthalenedicarboximido)-2,3,5,6-tetrachloro-p-xylene, polyethylene and 4,4'-bis(5,67,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polypropylene and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polyphenyl oxide and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, epoxy resins and 4,4'-bis(5,6,7,8,9,9-hexachloro-1,2,3,4,4a,5,8,8a-octahydro-5,8-methano-2,3-naphthalenedicarboximidomethyl)-2,2',-3,3',5,5',6,6'-octachlorodiphenyl ether, ABS and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polyvinyl chloride and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polycarbonate and 4,4'-bis(5,6,7,8,9,9-hexachloro-1,2,3,4,4a,5,8,8a-octahydro-5,8-methano-2,3-naphthalenedicarboximidomethyl)-2,2'3,3',5,5',6,6'-octachlorodiphenyl ether, polyurethane and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polyesters and 4,4'-bis(5,6,7,8,9,9-hexachloro-1,2,3,4,4a,5,8,8a-octahydro-5,8-methano-2,3-naphthalenedicarboximidomethyl)-2,2',3,3',5,5',6,6'-octachlorodiphenyl ether, polyethylene and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polypropylene and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polyphenyl oxide and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, epoxy resin and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, ABS and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polyvinyl chloride and 4,4'-bis(1,4,5,6,7,7-hexachlorobicyclo-[2.2.1]-5-heptene-2,3-dicarboximidomethyl)-2,2'3,3',5,5',6,6'-octachlorodiphenylamine, polycarbonate and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polyurethane and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polyesters and 4,4'-bis(1,4,5,6,7,7-hexachlorobicyclo-[2.2.1]-5-heptene-2,3-dicarboximidomethyl)-2,2',3,3',5,5',6,6'-octachlorodiphenylamine, polyethylene and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, polypropylene and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, polyphenyl oxide and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, epoxy resins and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, ABS and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, polyvinyl chloride and 4,4'-bis(1,4,5,6,7,7-hexachloro-bicyclo-[2.2.1]-5-heptene-2,3-dicarboximidomethyl)-2,2',3,3',5,5'6,6',-octachlorodiphenyl thioether,
polyvinyl chloride and 4,4-bis(1,4,5,6,7,7-hexachloro-bicyclo-[2.2.1]-5-heptene-2,3-dicarboximidomethyl)-2,2',3,3',5,5',6,6'-octachlorodiphenyl thioether,
polycarbonate and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether,
polyurethane and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether,
polyesters and 4,4'-bis(1,4,5,6,7,7-hexachlorobicyclo-[2.2.1]-5-heptene-2,3-dicarboximidomethyl)-2,2',3,3',5,5',6,6'-octachlorodiphenyl thioether, etc.

It is to be understood that the aforementioned novel flame retardant compositions of matter are only representative of the class of compositions of matter which may be prepared, and that the present invention is not necessarily limited thereto.

The following examples are given to illustrate the novel compositions of matter of the present invention which, however, are not intended to limit the generally broad scope of the present invention in strict accordance therewith.

Example I

In this example 68.5 g. (0.25 mol) of 2,3,5,6-tetrachloro-p-xylene-$\alpha,\alpha'$-diamine along with 212.5 g. (0.5 mol) of 5,6,7,8,9,9 - hexachloro - 1,2,3,4,4a,5,8,8a-octahydro - 5,8 - methano - 2,3 - naphthalenedicarboxylic anhydride plus about 200 cc. of xylene were refluxed. During this time, a negligible amount of water was distilled over. Following this, 200 g. of o-dichlorobenzene were added and the mixture was transferred to a two-liter, three-necked flask to facilitate mixing. The mixture was again heated to reflux until the water of addition which was formed had been condensed out. Following this, the reflux was discontinued, the precipitate which formed was filtered off, washed with benzene and methanol, and dried for a period of 16 hours. Following this, the desired product which comprised $\alpha,\alpha'$-bis-[5,6,7,8,9,9-hexachloro-1,2,3,4,4a,5,8,8a - octahydro-5,8-methano-2,3-naphthalenedicarboximido]-2,3,5,6 - tetrachloro-p-xylene was subjected to analysis.

Calculated for $C_{34}H_{20}Cl_{16}O_4N_2$ (percent): Cl, 52.2; N, 2.58. Found (percent): Cl, 51.8; N, 2.29.

In addition, the melting point was in excess over 370° C. with no color change or sublimation up to this point.

Example II

In this experiment 68.5 g. (0.25 mol) of 2,3,5,6-tetrachloro-p-xylene-$\alpha,\alpha'$-diamine and 218 g. (0.5 mol) of 5,6,7,8,9,9 - hexachloro - 1,2,3,4,4a,5,8,8a - octahydro - 1,4,5,8-dimethano-2,3 - naphthalenedicarboxylic anhydride along with 200 cc. of xylene and 200 g. of o-dichlorobenzene are refluxed in a two-liter flask provided with heating and stirring means for a period of about 8 hours. During this time, the water of addition which is formed is distilled over, the reaction being complete when no additional water has condensed out. At this point, heating is discontinued and the mixture is allowed to return to room temperature. The precipitate which has formed during the reaction is filtered, washed with benzene and methanol and dried for a period of 16 hours. The crystalline material which is recovered comprises the desired product, namely, $\alpha,\alpha'$-bis-[5,6,7,8,9,9-hexachloro-1,2,3,4,4a,5,8,8a - octahydro-1,4,5,8-dimethano-2,3-naphthalenedicarboximido]-2,3,5,6-tetrachloro-p-xylene.

Example III

A mixture of 319 g. (0.5 mol) of 1,4,5,6,7,7-hexabromobicyclo - [2.2.1] - 5 - heptene - 2,3 - dicarboxylic anhydride, 68.5 g. (0.25 mol) of 2,35,6 - tetrachloro-p-xylene-$\alpha,\alpha'$-diamine, 200 g. of o-dichlorobenzene, and 300 cc. of xylene is treated in a manner similar to that set forth in the above examples. After heating the mixture to a reflux temperature until no additional water of condensation is recovered, the mixture is allowed to cool to room temperature and filtered. The crystalline precipitate is washed with benzene and methanol and thereafter dried for a period of about 12 hours. The recovered crystalline material comprises $\alpha,\alpha'$-bis(1,4,5,6,7,7 - hexabromobicyclo - [2.2.1]-5-heptene-2,3-dicarboximido)-2,3,5,6-tetrachloro-p-xylene.

Example IV

A mixture of 212.5 g. of 5,6,7,8,9,9 - hexachloro - 1,2,3,4,4a,5,8,8a - octahydro - 5,8 - methano - 2,3-naphthalenedicarboxylic anhydride, 126 g. (0.25 mol) of 2,2',3,3',5,5',6,6' - octachloro-p-tolyl ether-$\alpha,\alpha'$-diamine, 200 g. of o-dichlorobenzene and 300 cc. of xylene is refluxed for a period of 8 hours until the water of condensation has ceased to form. The precipitate which forms during the reaction is filtered from the mother liquid, washed with benzene and methanol and allowed to dry for a period of about 12 hours. This material comprising the desired product is 4,4'-bis-[5,6,7,8,9,9-hexachloro-1,2,3,4,4a,5,8,8a-octahydro - 5,8 - methano - 2,3 - naphthalenedicarboximidomethyl] - 2,2',3,3',5,5',6,6' - octachlorodiphenyl ether.

Example V

In this example a mixture of 212.5 g. (0.5 mol) of 5,6,7,8,9,9 - hexachloro - 1,2,3,4,4a,5,8,8a - octahydro-5,8-methano - 2,3 - naphthalenedicarboxylic anhydride, 126 g. (0.25 mol) of 2,2',3,3',5,5',6,6'-octachloroditolylamine-$\alpha,\alpha'$-diamine, 200 g. of o-dichlorobenzene, and 300 cc. of xylene is refluxed for a period of time sufficient to complete the reaction, the completion of the reaction being evidenced by the fact that no additional water of condensation is formed. The resultant crystalline material is separated from the mother liquor, washed with benzene and dried. The crystalline material comprising the desired product, namely, 4,4'-bis-[1,4,5,6,7,7-hexachlorobicyclo - [2.2.1] - 5-heptene-2,3-dicarboximidomethyl]-2,2',3,3',5,5',6,6'-octachlorodiphenylamine is recovered.

Example VI

A mixture of 346 g. (0.5 mol) of 5,6,7,8,9,9-hexabromo-1,2,3,4,4a,5,8,8a - octahydro - 5,8 - methano - 2,3-naphthalenedicarboxylic anhydride, 132.5 g. (0.25 mol) of 2,2',3,3',5,5',6,6' - octachloroditolyl - 2,2 - propane-$\alpha,\alpha'$-diamine, 200 g. of o-dichlorobenzene, and 300 cc. of xylene is treated in a manner similar to that set forth above. After said treatment, the desired product comprising 4,4' - bis - [5,6,7,8,9,9 - hexabromo-1,2,3,4,4a,5,8,8a - octahydro - 5,8 - methano - 2,3 - naphthalenedicarboximidomethyl] - 2,2',3,3',5,5',6,6'-octachloro-2,2-diphenylpropane is recovered.

Example VII

In this example a mixture comprising 194.5 g. (0.5 mol) of 1,4,5,6,7,7-hexachlorobicyclo-[2.2.1]-5-heptene-2,3-dicarboxylic acid, 130 g. (0.25 mol) of 2,2',3,3',5,5', 6,6'-octachloro-p-diotoyl thioether-$\alpha,\alpha'$-diamine, 200 g. of o-dichlorobenzene, and 200 cc. of xylene is heated to reflux for a period of about 6 hours. During this time, all of the water of condensation which is formed is withdrawn and collected. When the formation of the water of condensation has ceased, the mixture is allowed to cool to room temperature. The crystalline material is separated from the mother liquor by filtration, washed with benzene and methanol, and thereafter dried and collected. This crystalline material comprises 4,4'-bis(1,4,5,6,7,7-hexachlorobicyclo-[2.2.1]-5-heptene - 2,3 - dicarboximidomethyl) - 2,2',3,3',5,5',6,6'-octachlorodiphenyl thioether.

Example VIII

A liquid epoxy resin having an epoxide equivalent weight of 190 and known in the trade as "Epon 828" is admixed with phthalic anhydride and 4,4'-bis-[5,6,7, 8,9,9-hexachloro-1,2,3,4,4a,5,8,8a-octahydro - 5,8 - methano-2,3-naphthalenedicarboximidomethyl] - 2,2′,3,3′,5,5′,6,6′-octachlorodiphenyl ether. The mixture is heated until said mixture becomes homogeneous and is poured into molds which are prepared from glass sheets using Teflon spacers. In addition, a mold release agent is also used to facilitate removal of the cured resins from the molds. The molds are placed in an air-circulating oven and allowed to cure for a period of about six hours at a temperature of 110° C. By utilizing various widths of spacers, sheets of various thickness are prepared. The sheets are then removed from the mold and cut into strips and are evaluated for flame retardancy. In addition to possessing excellent heat distortion temperatures and hardness, as measured by a Shore Durometer, the cured resin will be found to be self-extinguishing when removed from direct action of a flame.

Example IX

In like manner, a mixture comprising 150 g. of a polymer comprising polyphenyl ether (polyphenylene oxide) which has been modified with styrene and 50 g. of α,α′-bis-[5,6,7,8,9,9 - hexachloro - 1,2,3,4,4a,5,8,8a-octahydro-5,8 - methano - 2,3 - naphthalenedicarboximido]-2,3,4,6-tetrachloro-p-xylene are admixed at an elevated temperature in order to insure that the mixture is homogeneous. After the mixture is poured into molds and allowed to cool, the resulting composition of matter, upon testing, will be found to be self-extinguishing when removed from the direct action of a flame, thus illustrating the flame retardancy properties of the treated polyphenyl ethers.

Likewise, polycarbonates, when treated with the compositions of matter comprising the haloaryl imides of the polyhalopolyhydropolycyclicdicarboxylic acids will also exhibit flame-retardant properties, the treated polymers being self-extinguishing when removed from the action of a flame. In addition, the aforesaid compounds including, but not limited to, the epoxy resins, polycarbonates, polyolefins, polyesters, acrylic plastics, etc. which are treated by the addition of the haloaryl imides herein described in greater detail, will also exhibit greater stability as regards color when exposed to the direct action of sunlight over a period of time.

Example X

In this example 14.5 g. of α,α′-bis-[5,6,7,8,9,9-hexachloro - 1,2,3,4,4a,5,8,8a-octahydro - 5,8 - methano - 2,3-naphthalenedicarboximido] - 2,3,5,6 - tetrachlor-p-xylene which was prepared according to Example I above was milled with 85.5 g. of a commercial high molecular weight polypropylene and 0.5 g. of a polyhydroxypolycyclic butane oxidation inhibitor, said milling being accomplished for a period of five minutes at 185° C. The treated polypropylene was cut into strips which contained a glass cloth in the center of the strip to prevent dripping during the combusion. A strip of this treated polypropylene was then burned in an apparatus similar to the one described by C. P. Fenimore and J. F. Martin in the November 1966 issue of Modern Plastics. The polypropylene containing the haloaryl imide of the polyhalopolyhydropolycyclicdicarboxylic acid has an oxygen index (the lowest mol fraction of oxygen sufficient to maintain combustion) $n=0.185$. A similar strip of polypropylene which was milled with the oxidation inhibitor but did not contain the flame retardant compound when burned had an oxygen index of 0.180. A further difference was illustrated by the fact that the rate of combustion of the polypropylene containing the haloaryl imide was 190 seconds per inch of sample. The polypropylene sample which did not contain the haloaryl imide had a rate of combustion of 55 seconds per inch. This illustrates the flame retarding properties of the aforementioned α,α′-bis-[5,6,7,8,9,9-hexachloro - 1,2,3,4,4a,5,8,8a - octahydro - 5,8 - methano-2,3 - naphthalenedicarboximido] - 2,3,5,6 - tetrachloro-p-xylene.

Example XI

A commercial acrylonitrile-butadiene-styrene copolymer, after milling with an oxidation inhibitor, was pressed in strips as described above with a glass cloth in the center of the strip to prevent dripping during the combustion. In a second sample, 75 g. of the ABS was milled with 25 g. of α,α′-bis-[5,6,7,8,9,9-hexachloro-1,2,3,4,4a,5,8,8a-octahydro-1,4,5,8-dimethano - 2,3 - naphthalenedicarboximido]-2,3,5,6-tetrachloro-p-xylene and 0.15 g. of a butane oxidation inhibitor. The sample of ABS which contained no flame retarding inhibitor was burned in the apparatus described in Example X above. The oxygen index of this uninhibited compound was $n=0.182$. In contrast to this, the sample which contained 25 g. of the haloaryl imide which was prepared according to Example II above had an oxygen index in excess of $n=0.190$. This illustrates that the flame retarding properties of the ABS are improved by the addition of the aforementioned α,α′-bis-[5,6,7,8,9,9-hexachloro - 1,2,3,4,4a,5,8,8a-octahydro-1,4,5,8-dimethano - 2,3 - naphthalenedicarboximido] - 2,3,5,6-tetrachloro-p-xylene.

Example XII

In this example a commercial polyethylene is milled with α,α′ - bis(5,6,7,8,9,9-hexachloro - 1,2,3,4,4a,5,8,8a-octahydro-5,8-methano - 2,3-naphthalenedicarboximido)-2,3,5,6-tetrachloro-p-xylene and a polyhydroxypolycyclic-butane oxidation inhibitor at a temperature of about 180° C. for 5 minutes in such a proportion so that the finished composition of matter contains 15% by weight of the haloaryl imide compound. This composition of matter is then cut into a strip which contains a glass cloth in the center of the strip to prevent dripping during the combustion test. In addition, a second strip was also prepared by miling the polyethylene and the oxidation inhibitor alone, this strip also contained a glass cloth in the center thereof. The second strip was then subjected to a combustion test similar to that set forth in Example X above. It will be found that the strip of polyethylene will have a lower oxygen index than will the strip of the novel composition of matter of the present invention. A further difference is illustrated by the fact that the burning rate of the untreated polyethylene will be considerably less than the burning rate of the novel flame retardant composition of matter of this invention.

I claim as my invention:

1. A composition of matter comprising a polymer and a haloaryl imide of a polyhalo-substituted polyhydropolycyclicdicarboxylic acid having the formula:

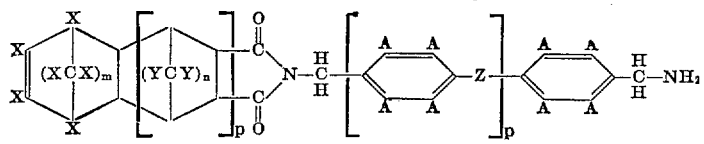

or

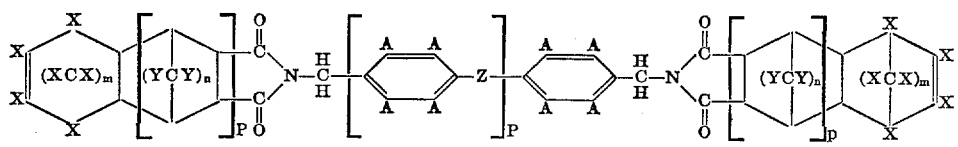

in which A, X, and Y are independently selected from the group consisting of hydrogen or halogen, at least one A and two X's being halogen; Z is selected from the group consisting of oxygen, sulfur, amino and lower alkyl radicals; $m$ is an integer of from 1 to 2; $n$ ranges from 0 to 2; and $p$ ranges from 0 to 1.

2. The composition of matter as set forth in claim 1 in which said haloaryl imide of a polyhalo-substituted polyhydropolycyclicdicarboxylic acid is present in said composition of matter in a range of from about 5% to about 50% by weight of the composition of matter.

3. The composition of matter as set forth in claim 1 in which said polymer compound is polypropylene and said haloaryl imide of a polyhalo-substituted polyhydropolycyclicdicarboxylic acid is α,α'-bis(5,6,7,8,9,9 - hexachloro - 1,2,3,4,4a,5,8,8a - octahydro - 5,8 - methano-2,3-naphthalenedicarboximido)-2,3,5,6-tetrachloro-p-xylene.

4. The composition of matter as set forth in claim 1 in which said polymer compound is polyphenyl oxide and said haloaryl imide of a polyhalo-substituted polyhydropolycyclicdicarboxylic acid is α,α'-bis(5,6,7,8,9,9 - hexachloro - 1,2,3,4,4a,5,8,8a - octahydro - 5,8 - methano-2,3-naphthalenedicarboximido)-2,3,5,6-tetrachloro-p-xylene.

5. The composition of matter as set forth in claim 1 in which said polymer compound is an epoxy resin and said haloaryl imide of a polyhalo-substituted polyhydropolycyclicdicarboxylic acid is 4,4'-bis(5,6,7,8,9,9 - hexachloro - 1,2,3,4,4a,5,8,8a - octahydro - 5,8 - methano-2,3-naphthalenedicarboximidomethyl) - 2,2',3,3',5,5',6,6' - octachlorodiphenyl ether.

6. The composition of matter as set forth in claim 1 in which said polymer compound is acrylonitrile-butadiene-styrene terpolymer and said haloaryl imide of a polyhalo-substituted polyhydropolycyclicidicarboxylic acid is 4,4' - bis(1,4,5,6,7,7 - hexachlorobicyclo - [2.2.1] - 5-heptene - 2,3 - dicarboximidomethyl) - 2,2',3,3',5,5',6,6'-octachlorodiphenylamine.

7. The composition of matter as set forth in claim 1 in which said polymer compound is polyethylene and said haloaryl imide of a polyhalo-substituted polyhydropolycyclicdicarboxylic acid is α,α'-bis(5,6,7,8,9,9 - hexachloro-1,2,3,4,4a,5,8,8a - octahydro - 1,4,5,8 - dimethano - 2,3-naphthalenedicarboximido)-2,3,5,6-tetrachloro-p-xylene.

References Cited
UNITED STATES PATENTS

| | | | |
|---|---|---|---|
| 3,574,231 | 4/1971 | Gaydasch | 260—326 |
| 3,511,852 | 5/1970 | Roberts et al. | 260—326 |
| 3,391,112 | 7/1968 | Hayes | 260—326 |
| 3,371,099 | 2/1968 | Geiser | 260—326 |
| 3,574,230 | 4/1971 | Cyba | 260—326 |
| 3,542,805 | 11/1970 | Cyba | 260—326 |

DONALD E. CZAJA, Primary Examiner

V. P. HOKE, Assistant Examiner

U.S. Cl. X.R.

106—15 FP; 117—136, 137; 252—8.1; 260—2.5 AJ, 2.5 FP, 45.7 R, 45.7 P, 45.75 R, 45.75 K, 45.8 N, 45.95, 814